United States Patent
Rigie et al.

(10) Patent No.: US 9,672,638 B2
(45) Date of Patent: Jun. 6, 2017

(54) SPECTRAL X-RAY COMPUTED TOMOGRAPHY RECONSTRUCTION USING A VECTORIAL TOTAL VARIATION

(71) Applicants: The University of Chicago, Chicago, IL (US); Toshiba Medical Systems Corporation, Otawara-shi (JP)

(72) Inventors: David Rigie, Chicago, IL (US); Patrick La Riviere, Chicago, IL (US); Adam Petschke, Lake Bluff, IL (US)

(73) Assignees: THE UNIVERSITY OF CHICAGO, Chicago, IL (US); TOSHIBA MEDICAL SYSTEMS CORPORATION, Otawara-shi (JP)

( * ) Notice: Subject to any disclaimer, the term of this patent is extended or adjusted under 35 U.S.C. 154(b) by 382 days.

(21) Appl. No.: 14/305,936

(22) Filed: Jun. 16, 2014

(65) Prior Publication Data
US 2015/0363947 A1 Dec. 17, 2015

(51) Int. Cl.
*G06K 9/00* (2006.01)
*G06T 11/00* (2006.01)

(52) U.S. Cl.
CPC .. *G06T 11/005* (2013.01); *G06T 2207/10081* (2013.01); *G06T 2211/408* (2013.01)

(58) Field of Classification Search
CPC ........... A61B 6/482; A61B 6/032; A61B 6/12; A61B 6/505
(Continued)

(56) References Cited

U.S. PATENT DOCUMENTS 6,631,284 B2* 10/2003 Nutt ..................... A61B 6/032
  250/363.03
7,338,625 B2* 3/2008 Kellenberger ...... A61F 13/4902
  264/136
(Continued)

OTHER PUBLICATIONS

A. Chambolle, et al., "A first-order primal-dual algorithm for convex problems with application to imaging" Journal of Mathematical Imaging and Vision, vol. 40, No. 1, pp. 120-145, May 2011.
(Continued)

*Primary Examiner* — Yosef Kassa
(74) *Attorney, Agent, or Firm* — Oblon, McClelland, Maier & Neustadt, L.L.P.

(57) ABSTRACT

An apparatus and method of reconstructing a computed tomography (CT) image using multiple datasets of projective measurements, wherein the method of image reconstruction favors spatial correlations among the images respectively reconstructed from each of the corresponding multiple datasets. The multiple data sets each contain projective measurements of the same object taken in close temporal proximity, but taken with different detector type or configurations (e.g., different spectral components in spectral CT or different detector types in hybrid $3^{rd}$- and $4^{th}$-generation CT scanners). Reconstructed images minimizing a vectorial total variation norm satisfies the criteria of favoring images exhibiting spatial correlations among the reconstructed images and favoring a sparse gradient-magnitude image (i.e., edge enhancing image) for each reconstructed image.

22 Claims, 9 Drawing Sheets

(58) Field of Classification Search
USPC ....... 382/128, 130, 131, 132, 154, 278, 284; 128/922, 923
See application file for complete search history.

(56) References Cited

U.S. PATENT DOCUMENTS

| | | | | |
|---|---|---|---|---|
| 7,412,022 | B2* | 8/2008 | Jupiter | G01N 23/046 250/363.06 |
| 7,603,165 | B2* | 10/2009 | Townsend | A61B 6/032 250/363.03 |
| 7,660,385 | B2* | 2/2010 | Boyden | A61B 6/00 378/44 |
| 7,734,076 | B2* | 6/2010 | Du | A61B 6/032 378/16 |
| 7,773,722 | B2* | 8/2010 | Boyden | A61B 5/415 378/44 |
| 7,983,380 | B2* | 7/2011 | Guertin | A61N 5/1069 378/4 |
| 8,086,012 | B2* | 12/2011 | Toth | A61B 5/411 378/4 |
| 8,477,901 | B2* | 7/2013 | Dolazza | A61B 6/502 378/22 |
| 2014/0355853 | A1 | 12/2014 | Zou et al. | |

OTHER PUBLICATIONS

E. Y. Sidky, et al., "Accurate image reconstruction from few-views and limited-angle data in divergent-beam CT," Journal of X-Ray Science and Technology, vol. 14, No. 2, pp. 119-139, Jan. 2006.
R. E. Alvarez, et al., "Energy-selective reconstructions in x-ray computerized tomography," Physics in Medicine and Biology, vol. 21, No. 5, p. 733-744, Sep. 1976.
W. H. Sommer, et al., "Image quality of virtual noncontrast images derived from dual-energy CT angiography after endovascular aneurysm repair," Journal of Vascular and Interventional Radiology, vol. 21, No. 3, pp. 315-321, Mar. 2010.
A. N. Primak, et al., "Noninvasive differentiation of uric acid versus NonUric acid kidney stones using dual-energy CT" Academic Radiology, vol. 14, No. 12, pp. 1441-1447, Dec. 2007.
C. Sun, et al., "An initial qualitative study of dual-energy CT in the knee ligaments," Surgical and Radiologic Anatomy, vol. 30, No. 5, pp. 443-447, Jul. 2008.
B. Goldluecke, et al., "The natural vectorial total variation which arises from geometric measure theory," SIAM Journal on Imaging Sciences, vol. 5, No. 2, pp. 537-563, Jan. 2012.
P. Blomgren, et al., "Color TV: total variation methods for restoration of vector-valued images," IEEE Transactions on Image Processing, vol. 7, No. 3, pp. 1-24, May 23, 1996.
P.L. Combettes, et al., "Proximal splitting methodsin signal processing," in Fixed-Point Algorithms for Inverse Problems in Science and Engineering. Springer, May 18, 2010, ppl. 1-25.
E. Y. Sidky, et al., "Convex optimization problem prototyping for image reconstruction in computer tomography with the ChambollePock algorithm" Physics in Medicine and Biology, vol. 57, No. 10, p. 3065-3091, May 2012.
W. Segars, et al., "Development and application of the new dynamic nurbs-based cardiac-torso (NCAT) phantom." School of Nursing Faculty Publication Series, vol. 42, No. 5, Jan. 2001.
Dimitri P. Bertsekas, "Nonlinear Programming", Second Edition, Athena Scientific,1999, pp. 1-786 and Cover Pages (Book).
P. L. Lions, et al., "Splitting algorithms for the sum of two nonlinear operators", SIAM Journal of Numerical Analysis, vol. 16, No. 6, 1979, pp. 964-979.
Ernie Esser, "Applications of Lagrangian-Based Alternating Direction Methods and Connections to Split Bregman", CAM Reports 09-31, UCLA, Center for Applied Math, 2009, pp. 1-32.
G. M. Korpelevič, "An extragradient method for finding saddle points and for other problems", Èkonom, I Mat. Metody, 12, 1976, pp. 747-756 and Cover Pages.
Kenneth J. Arrow, et al., "Studies in linear and non-linear programing", Stanford University Press, 1958, pp. 1-229 and Cover Pages (Book).
Yu. Nesterov. "Smooth minimization of non-smooth functions", Math. Program. Ser. A, 103, 2005, pp. 127-152.

* cited by examiner

SPECTRAL X-RAY COMPUTED TOMOGRAPHY RECONSTRUCTION USING A VECTORIAL TOTAL VARIATION

BACKGROUND

Field

Embodiments described herein relate generally to a method of reconstructing computed tomography images, and more specifically to reconstructing computed tomography images using more than one data set acquired using more than one detector configuration.

Description of the Related Art

The past several years have seen technological advances that are fueling improvements to X-ray computed tomography (CT), including: new iterative image reconstruction algorithms with novel regularization methods, and rapid development of spectral CT. Specifically, there has been a growing interest in iterative reconstruction algorithms for CT using total-variation (TV) regularization, which can lead to high quality reconstructions from highly undersampled projection data. Simultaneously, the development of spectral CT exhibits numerous advantageous over conventional CT. For example, spectral CT offers the additional clinical information inherent in the full spectrum of an X-ray beam. Moreover, spectral CT facilitates, in discriminating tissues, differentiating between materials such as tissues containing calcium and iodine, and enhancing the detection of smaller vessels. Among other advantages, spectral CT is also expected to reduce beam-hardening artifacts.

One well known iterative technique is the Algebraic Reconstruction Technique (ART). This technique is essentially a method for iteratively solving the matrix equation $$f = Au,$$

where f is a vector of the projection measurements, u is a vector of the image values, and A is a system matrix corresponding to the discretized Radon transform of the X-ray beams passing through an image object. By recognizing that each row vector $\vec{A}_i$ of the matrix A together with the corresponding projection value $f_i$ defines an affine space, an image of the image object can be found through successive affine projections onto the successive affine spaces corresponding to the rows of A. This iterative process converges by using the previous estimate of the image vector $u_{m-1}^i$ to solve for the current image vector estimate $u_m^i$ using the expression $$u_m^i = u_{m-1}^i - \vec{A}_{m-1}(f_{m-1} - \vec{A}_{m-1} \cdot u_{m-1}^i / \vec{A}_{m-1} \cdot \vec{A}_{m-1}),$$

where each iteration progressively estimates $u_m^i$ for $m = 2, \ldots, N_{Data}$, $u_1^0$ is the initial guess, and the superscript i indicates the $i^{th}$ iteration of affine projections for all values of m. The iterative process continues until the image estimates converge according to some predefined metric.

Typically, following a series of affine projections, a constraint is imposed in order to ensure that the image u converges to a physically meaningful image. For example, in absorption imaging, the image value must be non-negative because a negative absorption value implies gain, which is not physically realistic. Therefore, the final value after each iteration, $u_{NData}^i$, is subject to a predefined constraint based on a priori knowledge of the image (e.g., no gain), and the constrained final value is then used as the initial value, $u_1^{i+1}$, for the next iteration of affine projections. Periodically subjecting the image estimates to a predefined constraint is referred to as regularization.

Iterative reconstruction algorithms augmented with regularization can produce high-quality reconstructions using only a few views and even in the presence of significant noise. For few-view, limited-angle, and noisy projection scenarios, the application of regularization operators between reconstruction iterations seeks to tune the final result to some a priori model. For example, enforcing positivity, as discussed above, is a simple but common regularization scheme. Minimizing the "total variation" (TV) in conjunction with projection on convex sets (POCS) is also a very popular regularization scheme. The TV-minimization algorithm assumes that the image is predominantly uniform over large regions with sharp transitions at the boundaries of the uniform regions. When the a priori model corresponds well to the image object, these regularized iterative reconstruction algorithms can produce impressive images even though the reconstruction problem is significantly underdetermined (e.g., few view scenarios), missing projection angles, or noisy.

In addition to the ART iterative image reconstruction method, the reconstruction problem can be solved using the TV semi-norm regularization by using the primal-dual algorithm developed by Chambolle and Pock. The Chambolle-Pock (CP) algorithm applied to the TV semi-norm solves the problem $$\min_u \left\{ \frac{1}{2} \|Au - f\|_2^2 + \lambda \|(|\nabla u|)\|_1 \right\},$$

where the last term, the $l_1$-norm of the gradient-magnitude image, is the isotropic TV semi-norm. This expression is referred to as the primal minimization. The spatial-vector image $\nabla u$ represents a discrete approximation to the image gradient. The expression $|\nabla u|$ is the gradient-magnitude image, an image array whose pixel values are the gradient magnitude at the pixel location. Through a process of first finding the convex conjugate of the expressions inside the minimization function, one can obtain the dual maximization. There are several methods for solving the primal-dual saddle point in order to solve the reconstruction problem. The CP algorithm uses the forward-backward proximal-splitting method to obtain an iterative algorithm that converges to an image satisfying the TV minimization problem. For the case of the TV semi-norm, the pseudo-code for the resulting iterative algorithm is given in Table 1.

TABLE 1

Pseudocode for N-steps of the CP algorithm using the TV semi-norm.

```
1:   L ← ||(A, ∇)||_2; τ ← 1/L; σ ← 1/L; θ ← 1; n ← 0
2:   initialize u_0, p_0, and q_0 to zero values
3:   ū_0 ← u_0
4:   repeat
5:     p_{n+1} ← (p_n + σ(Aū_n − f))/(1 + σ)
6:     q_{n+1} ← λ(q_n + σ∇ū_n)/max(λ1_I, |q_n + σ∇ū_n|)
7:     u_{n+1} ← u_n − τA^T p_{n+1} + τDiv q_{n+1}
8:     ū_{n+1} ← u_{n+1} + θ(u_{n−1} − u_n)
9:     n ← n + 1
10:  until n ≥ N
```

The constant L is the $\ell_2$-norm of the matrix (A, ∇); τ and σ are nono-negative CP alogorithm paramters, which can be set to 1/L; θ ∈ [0,1] is another CP algorithm parameter, which can be set to 1; n is the iteration index; u_0 can be initialized to an initial guess of the image; p_0 can be initialized to the projection data; q_0 can be initialized to the image gradient; and 1_I is a diagonal matrix with ones along the diagonal; and Div is the divergence operator.

Also, rapid advances in energy-discriminating detectors have generated a surge of interest in spectral CT, where the broad x-ray tube spectrum is sampled into spectrally unique channels of data, which could lead to the elimination of common artifacts, patient dose reduction, and new applications of CT.

Here, we adopt notation conventions for two different kinds of matrix norms in order to avoid confusion. The first type is the "entry-wise" p-norm, which for matrix X is defined as $$\|X\|_p = \left(\sum_{i,j} |X_{ij}|^p\right)^{1/p}.$$

For p=2 we get the common "Frobenius norm."

The second type is the "Schatten p-norm," which arises when applying the $l_p$-norm to the vector of singular values associated with X. Here the uncommon notation $\|\cdot\|_{Sp}$ is used, where specifically for a matrix X, the Schatten p-norm is given by $$\|X\|_{Sp} = \left(\sum_i |\sigma_i|^p\right)^{1/p},$$

where $\sigma_i$ denotes the ith singular value of X. Some common special cases are the "nuclear norm" (p=1), the Frobenius norm (p=2), and the "spectral norm" (p=∞).

BRIEF DESCRIPTION OF THE DRAWINGS

A more complete understanding of this disclosure is provided by reference to the following detailed description when considered in connection with the accompanying drawings, wherein.

DETAILED DESCRIPTION

In one embodiment, a CT scanner combines datasets from multiple detector types and configurations, e.g., a combination of data from both an energy-integrating detector array densely arranged in a third-generation geometry and from a photon-counting detector array sparsely arranged in a fourth-generation geometry. While it is possible to process each unique dataset type independently obtaining a separate image for each dataset type (e.g., a third-generation detector image and also a fourth-generation detector image), separately processing the projection datasets overlooks the shared information among the different dataset types. This shared information can be a valuable resource to improve image quality. For example, an image of soft tissues within a body will exhibit edges at the boundaries between organs, and as the organs occupy the same location in each image for each dataset type, there will be a high degree of spatial correlation among images obtained using different detector types. By processing datasets from different detector types collectively, the signals (e.g., edges) present in each dataset type are reinforced, while uncorrelated noise among different detector types average out. Thus, the strong spatial correlations between images obtained using different dataset types can be exploited by using image reconstruction that favors spatial correlations among images obtained using different detection methods.

By different dataset type we mean that each type of projection data is acquired using different detector configurations. The term "different detector configurations" is construed broadly to include different types of detectors (e.g., energy-integrating detectors and photon-counting detectors in different spatial arrangements) and identical detectors (e.g., photon-counting detectors) configured to differentiate between detection events (e.g., differentiate X-ray energies) such that the collected data can be organized into separate dataset types (e.g., energy bins).

In one implementation, the dataset types will be material decompositions resulting from spectral CT measurements. In spectral CT, projection images are obtained for various X-ray energy spectra. Because two physical processes (i.e., photoelectric scattering and Compton scattering) with different spectral responses to X-rays dominate the attenuation, the attenuation coefficient as a function of energy and position can to a good approximation be decomposed into two components $$\mu(E,x,y)=\mu_{PE}(E,x,y)+\mu_C(E,x,y),$$

where $\mu_{PE}(E, x, y)$ is the photoelectric attenuation and $\mu_C(E, x, y)$ is the Compton attenuation. This two component decomposition of the attenuation coefficient can be further rearranged into a decomposition of a high-Z material (i.e., material 1) and a low-Z material (i.e., material 2) to become $$\mu(E,x,y)\approx\mu_1(E)c_1(x,y)+\mu_2(E)c_2(x,y).$$

Thus, multiple datasets corresponding to different X-ray spectra can be converted into two projection datasets corresponding to a material decomposition as discussed in U.S. patent application Ser. No. 13/906,110, incorporated herein by reference in its entirety.

The images reconstructed from datasets arising from the material decomposition will exhibit spatial correlations similar to images from datasets from different detector configurations, except the images for different materials will be negatively correlated rather than positively correlated. Still for material decomposition datasets there will be strong spatial correlations because in an image the edges where material 1 ends correspond to the edges where material 2 begins. The vectorial total-variation (VTV) regularization, discussed next, is used in a collective image reconstruction method that favors image solutions where the edges of each reconstructed image are spatially correlated. Therefore the VTV regularization and reconstruction method are applicable to reconstructing images for datasets that are negatively or positively correlated provided the edges of the reconstructed images are spatially correlated. Although the VTV method is applicable to both negatively and positively correlated reconstructed images, the discussion herein is, without loss of generality, directed toward the case of positively correlated reconstructed images.

One method of combined data image reconstruction that favors spatial correlations among images is iterative image reconstruction using vectorial total-variation (VTV) regularization. In addition to favoring spatial correlations, VTV regularization, like TV regularization, is edge enhancing and provides high quality images even with few-view data. Additionally, VTV regularization is convex, making the image reconstruction method numerically robust.

Thus, in one embodiment, there is provided an apparatus, comprising processing circuitry configured to (1) obtain a plurality of projection datasets, wherein each projection dataset of the plurality of projection datasets is obtained from a different detector type or configuration; and (2) reconstruct, from the plurality of projection datasets, a corresponding plurality of images using a combined image reconstruction method, wherein the combined image reconstruction method increases a spatial correlation among the corresponding plurality of images relative to a spatial correlation among a plurality of images that are reconstructed using an individual image reconstruction method that individually reconstructs each of the plurality of images using a respective projection dataset of the plurality of projection datasets.

Figure 1:
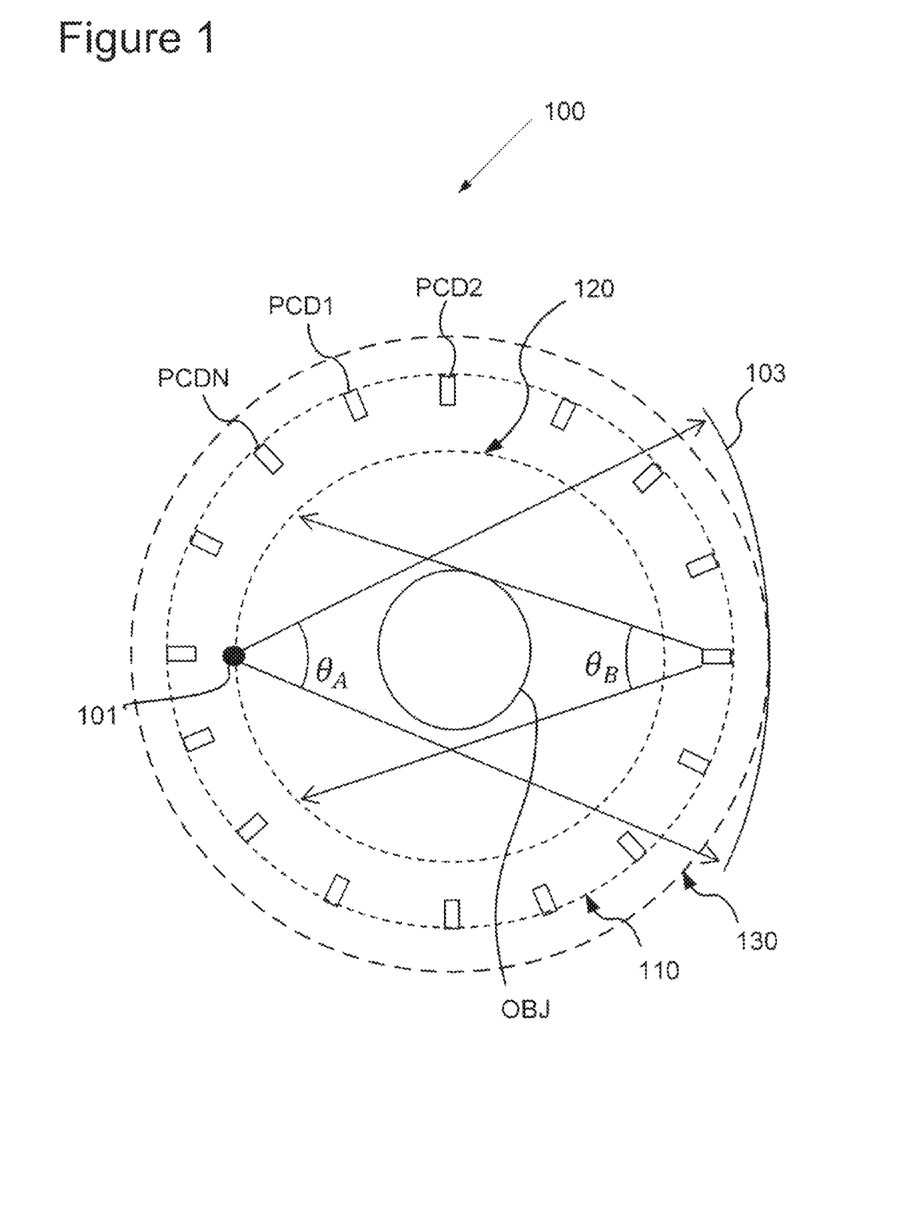
FIG. 1 shows a diagram of a cross-section of a combined third-generation and fourth generation computed tomography apparatus.

Referring now to the drawings, wherein like reference numerals designate identical or corresponding parts throughout the several views, FIG. 1 shows a diagram illustrating an implementation for placing the photon-counting detectors (PCDs) in a predetermined fourth-generation geometry in combination with a detector unit in a predetermined third-generation geometry in a CT scanner system. The diagram illustrates relative positions among an object OBJ to be scanned, an X-ray source 101, an X-ray detector 103, and the photon-counting detectors PCD1 through PCDN in one exemplary embodiment. For the sake of simplicity, the diagram excludes other components and units that are necessary in acquiring and processing data as well as reconstructing an image based upon the acquired data. In general, the photon-counting detectors PCD1 through PCDN each output a photon count for each predetermined energy bin. In addition to the sparse photon-counting detectors PCD1 through PCDN in the fourth-generation geometry, the implementation shown in FIG. 1 includes a detector unit such as the detector 103 in a conventional third-generation geometry in the CT scanner system. The detector elements in the detector unit 103 can be more densely placed along the detector unit surface than the photon-counting detectors.

In one implementation, the photon-counting detectors are sparsely placed around the object OBJ in a predetermined geometry such as a circle. For example, the photon-counting detectors PCD1 through PCDN are fixedly placed on a predetermined circular component 110 in the gantry 100. In one implementation, the photon-counting detectors PCD1 through PCDN are fixedly placed on the circular component 110 at predetermined equidistant positions. In an alternative implementation, the photon-counting detectors PCD1 through PCDN are fixedly placed on the circular component 110 at predetermined non-equidistant positions. The circular component 110 remains stationary with respect to the object OBJ and does not rotate during the data acquisition.

Both the X-ray source 101 and the detector unit 103 rotate around the object OBJ while the photon-counting detectors PCD1 through PCDN are stationary with respect to the object OBJ. In one implementation, the X-ray source 101 is mounted on a first rotating portion 120 such as the annular frame in the gantry 100 so that the X-ray source 101 projects X-ray radiation with a predetermined source fan beam angle $\theta_A$ towards the object OBJ while the X-ray source 101 rotates around the object OBJ inside the sparsely placed photon-counting detectors PCD1 through PCDN. Furthermore, an additional detector unit 103 is mounted on a second rotating portion 130 in the third-generation geometry. The rotating portion 130 mounts the detector unit 103 at a diametrically opposed position from the X-ray source 101 across the object OBJ and rotates outside the stationary circular component 110, on which the photon-counting detectors PCD1 through PCDN are fixedly placed in a predetermined sparse manner.

In one implementation, the rotating portions 120 and 130 are integrally constructed as a single component, such as the annular frame 102, to maintain a 180-degree angle between the X-ray source 101 and the detector unit 103 as they rotate about the object OBJ with a different radius. In an optional implementation, the rotating portions 120 and 130 are separate components, but synchronously rotate to maintain the X-ray source 101 and the detector unit 103 in the fixedly opposed positions at 180 degrees across the object OBJ. Furthermore, the X-ray source 101 optionally travels a helical path as the object is moved in a predetermined direction that is perpendicular to the rotational plane of the rotating portion 120.

As the X-ray source 101 and the detector unit 103 rotate around the object OBJ, the photon-counting detectors PCDs and the detector unit 103 respectively detect the transmitted X-ray radiation during data acquisition. The photon-counting detectors PCD1 through PCDN intermittently detect with a predetermined detector fan beam angle $\theta_B$ the X-ray radiation that has been transmitted through the object OBJ and individually output a count value representing a number of photons, for each of predetermined energy bins. On the other hand, the detector elements in the detector unit 103 continuously detect the X-ray radiation that has been transmitted through the object OBJ and output the detected signals as the detector unit 103 rotates. In one implementation, the detector unit 103 has densely placed energy-integrating detectors in predetermined channel and segment directions on the detector unit surface.

In one implementation, the X-ray source 101, the photon-counting detectors and the detector unit 103 collectively form three predetermined circular paths that differ in radius. The photon-counting detectors are sparsely placed along a first circular path around the object OBJ while at least one X-ray source 101 rotates along a second circular path around the object OBI Further, the detector unit 103 travels along a third circular path. The above exemplary embodiment illustrates that the third circular path is the largest and outside the first and second circular paths around the object OBJ. Although not illustrated, an alternative embodiment optionally changes the relative relation of the first and second circular paths so that the second circular path for the X-ray source 101 is larger and outside the first circular path of the sparsely placed photon-counting detectors PCD1 through PCDN around the object OBJ. Furthermore, in another alternative embodiment, the X-ray source 101 also optionally travels on the same third circular path as the detector unit 103. Furthermore, the above alternative embodiments optionally provide a protective rear cover for each of the photon-counting detectors that are irradiated from behind in a short distance as the X-ray source 101 travels outside the first circular path of the sparsely placed photon-counting detectors.

There are other alternative embodiments for placing the photon-counting detectors in a predetermined fourth-generation geometry in combination with the detector unit in a predetermined third-generation geometry in the CT scanner. The X-ray source 101 is optionally a single energy source in certain embodiments. By the same token, an additional alternative embodiment optionally includes the X-ray source 101, which is configured to perform a kV-switching function for emitting X-ray radiation at a predetermined high-level energy and at a predetermined low-level energy.

In general, the photon-counting detectors PCD1 through PCDN are sparsely positioned along the circular component 110. Although the photon-counting detectors PCD1 through PCDN acquire sparse view projection data, the acquired projection data is sufficient for at least dual-energy reconstruction with a sparse view reconstruction technique. In addition, the detector unit 103 also acquires another projection dataset, and the projection data from the detector unit 103 is used to generally improve image quality. In case that the detector unit 103 consists of energy-integrating detectors with anti-scatter grids, the projection data from the detector unit 103 is used to correct scatter on the projection data from the photon-counting detectors. In one implementation, the integrating detectors optionally need to be calibrated in view of X-ray transmission through the predetermined circular component 110 and some of the photon-counting detectors. In acquiring the projection data, a sampling on the source trajectory is optionally made dense in order to enhance spatial resolution.

Figure 2:
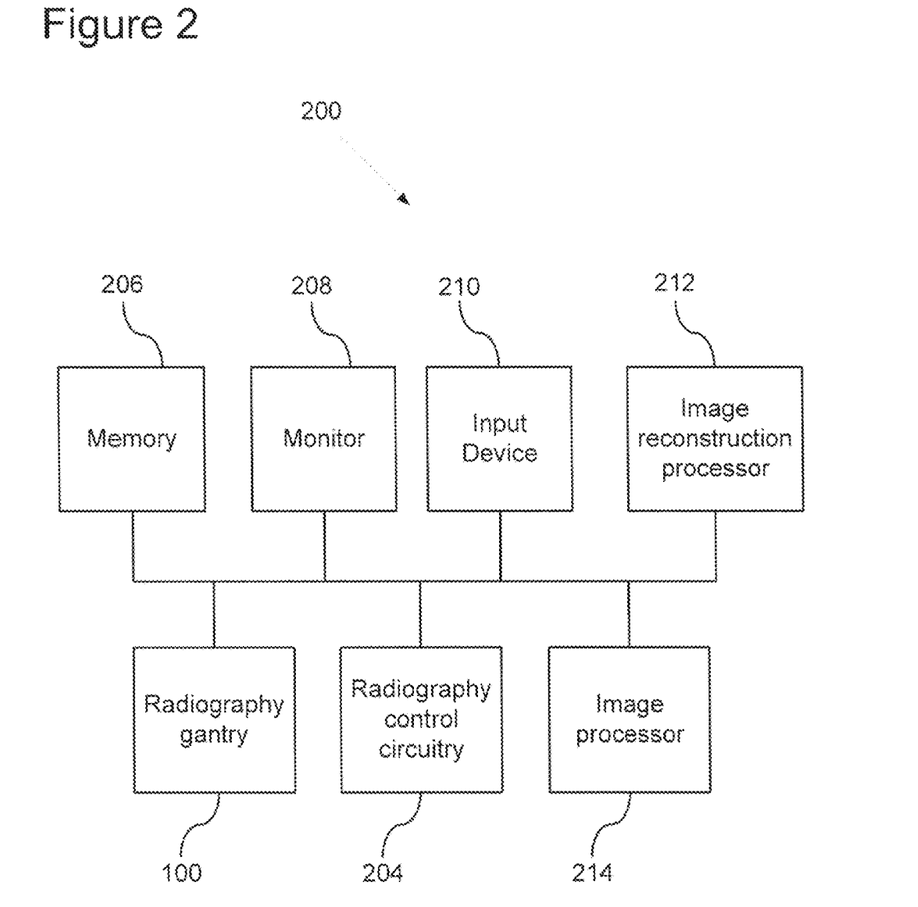
FIG. 2 shows a schematic of a computed tomography system.

FIG. 2 shows a schematic of an X-ray CT scanner system 200. The X-ray CT scanner system 200 comprises a radiography gantry 100, radiography control circuitry 204, memory 206, monitor 208, input device 210, image reconstruction unit 212, and image processor 214.

Figure 3:
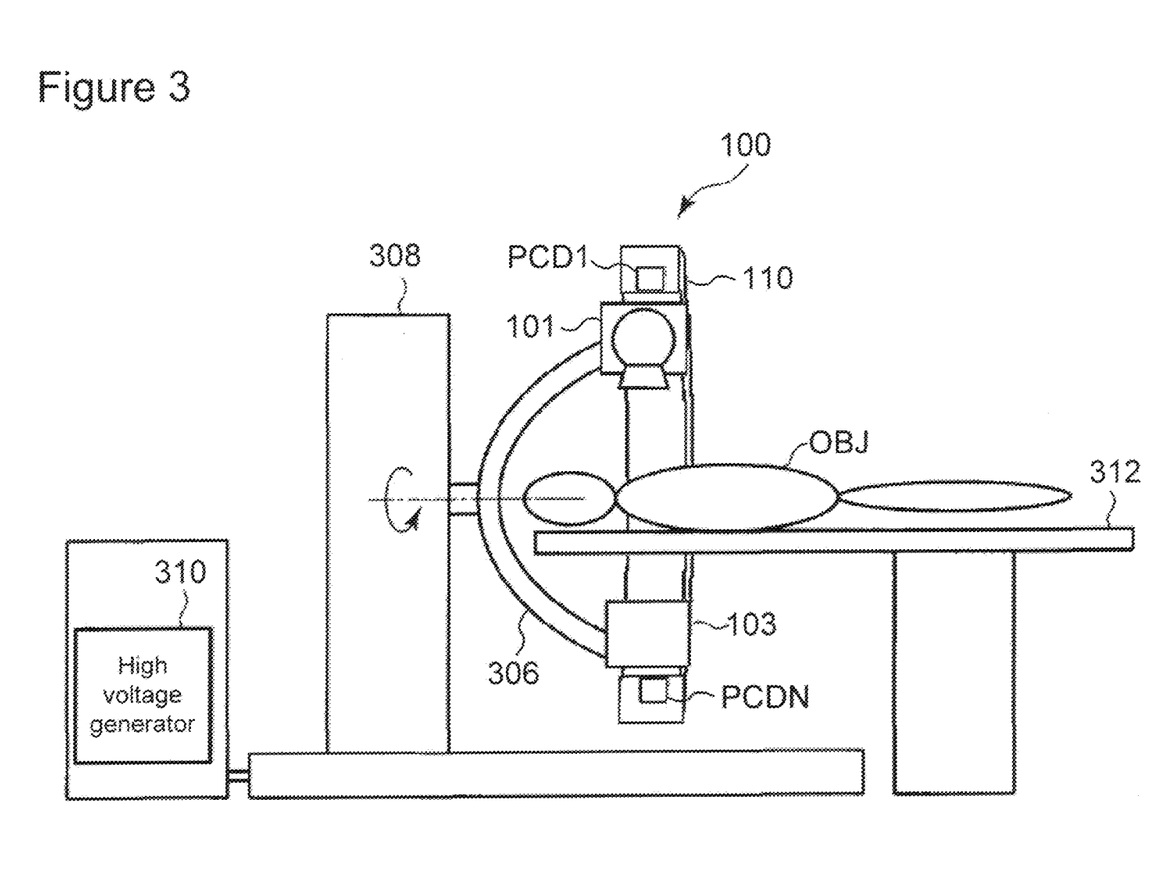
FIG. 3 shows an implementation of a computed tomography system.

FIG. 3 shows an example of the outer appearance of the radiography gantry 100. As shown in FIG. 3, the radiography gantry 2 includes an X-ray source 101, a third-generation energy-integrating X-ray detector 103, a plurality of fourth-generation photon-counting detectors PCD1 through PCDN arranged on a stationary circular component 110, a C-arm 306, a stand 308, a high voltage generator 310, and a bed 312.

The high voltage generator 310 generates a high voltage to be applied between the electrodes of the X-ray source 101. Upon receiving the high voltage and filament current, the X-ray source 101 generates X-ray radiation. The third-generation X-ray detector 103 is a two-dimensional array of energy integrating detection elements (pixels) which directly or indirectly convert incident X-ray radiation into electric charges. The photon-counting detectors in a fourth-generation geometry are sparsely arranged along the stationary circular component 110. In FIG. 3 the stationary circular component 110 is shown to be semicircular in shape. In an alternative implementation, the shape of the stationary circular component 110 can be a complete circle. The X-ray source 101 is mounted on, for example, one end of the floor type C-arm 306. The third-generation X-ray detector 103 is mounted on the other end of the C-arm 306. The third-generation X-ray detector 103 faces the X-ray source 101 through an object OBJ to be examined which is placed on the bed 312. The C-arm 306 is rotatably supported on the stand 308. Repeating radiography with respect to the object OBJ while rotating the C-arm 306 makes it possible to acquire X-ray images (projection data) in many directions which are required for CT image reconstruction.

In an alternative implementation, rather than being mounted to a C-arm 306, the X-ray source 101, third-generation X-ray detector 103, and fourth-generation photon-counting X-ray detectors can be mounted to annular frames that completely encircle the object OBJ. As shown in FIG. 1, the third-generation energy integrating detectors can be arranged in a predetermined third-generation geometry, and the photon-counting detectors can be arranged in a predetermined fourth-generation geometry. The annular frame can be fixed in space and the X-ray source 101 moves relative to the annular frame, as shown in FIG. 1. Also, the energy-integrating detectors in the predetermined third-generation geometry can also move relative to the annular frame, as shown in FIG. 1.

The radiography control circuitry 204 controls the rotation of the C-arm 306, the application of high voltages from the high voltage generator 310 to the X-ray source 101, and the reading of signals from the X-ray detector 304 in order to execute rotational radiography and generate X-ray projection data.

The memory 206 stores a dedicated program for executing a VTV-norm-based iterative image reconstruction method to be described below.

The monitor 208 is a display device such as a CRT, plasma display, or liquid crystal display which displays an X-ray diagnostic image in a predetermined form in accordance with a signal received from the image reconstruction processor 212 or the image processor 214.

The input device 210 includes a keyboard, various kinds of switches, a mouse, etc. and is used to input a radiography instruction, image selection instruction, etc. The image reconstruction processor 212 reconstructs volume data from projection images in a plurality of projection directions.

The image processor 214 executes predetermined image processing such as volume rendering processing and image difference processing as needed.

The VTV-norm-based iterative image reconstruction method is similar to the total-variation semi-norm iterative image reconstruction method but applies to multi-detector configuration datasets, such as spectral CT multi-energy datasets. The simplest way to apply the conventional TV-based reconstruction methods to spectral CT is to separately reconstruct the projection data from each spectral channel on a channel-by-channel basis, but a superior reconstruction can be obtained by using the generalized vectorial TV (VTV) norm that leverages the strong spatial correlations in the image domain between the various channels.

The disclosed VTV-norm-based algorithm is motivated by the notion that images reconstructed from different channels should have a common edge structure. For comparison, the conventional TV-norm-based algorithm pertains to scalar image functions (e.g., a single projection dataset type) and its application to CT reconstruction is motivated by the idea that the gradient-magnitude image should be approximately sparse. The VTV-norm-based algorithm generalizes this approach for vector image functions and is based on the nuclear norm of the Jacobian derivative.

In addition to introducing a desirable coupling between the spectral channels, the VTV-norm-based algorithm has a simple dual formulation and can be handled readily by many of the conventional primal-dual algorithms with virtually no increase in computational burden. These conventional primal-dual algorithms include: the forward-backward proximal splitting method (discussed in P. L. Combettes and J.-C. Pesquet, "Proximal Splitting methods in signal processing,"

in *Fixed-Point Algorithms for Inverse Problems in Science and Engineering*, Springer, p. 185 (2011), incorporated herein by reference in its entirety, and discussed in D. P. Bertsekas, *Nonlinear Programming, Second Edition*, Athena Scientific (1999), incorporated herein by reference in its entirety), the Douglas-Rachford splitting method (discussed in P. Lions and B. Mercier, "Splitting algorithms for the sum of two nonlinear operators," *SIAM Journal of Numerical Analysis*, 16, p. 964 (1979), incorporated herein by reference in its entirety), the alternating direction method of multipliers (discussed in E. Esser, "Applications of lagrangian-based alternating direction methods and connections to split bergman," *CAM Reports* 09-31, UCLA, Center for Applied Math (2009), incorporated herein by reference in its entirety), the Korpelevich extragradient method (discussed in G. M. Korpelevič, "An extragradient method for finding saddle points and for other problems," *Èkonom, I Mat. Metody*, 12, p. 747 (1976), incorporated herein by reference in its entirety), the Arrow-Hurwicz method (discussed in K. J. Arrow, L. Hurwicz, and H. Uzawa, *Studies in linear and nonlinear programing*, Stanford University Press (1958), incorporated herein by reference in its entirety), the Nesterov's smoothing method (discussed in Yu. Nesterov, "Smooth minimization of non-smooth functions," *Math. Program Ser. A*, 103, p. 127 (2005), incorporated herein by reference in its entirety), and the Chambolle-Pock primal-dual method (discussed in A. Chambolle and T. Pock, "A first-order primal-dual algorithm for convex problems with applications to imaging," *Journal of Mathematical Imaging and Vision*, 40, p. 120 (2011), incorporated herein by reference in its entirety, and discussed in E. Y. Sidky, J. H. Jørgensen, and X. Pan, "Convex optimization problem prototyping for image reconstruction in computed tomography with the Chambolle-Pock algorithm," *Physics in Medicine and Biology*, 57, p. 3065 (2012), incorporated herein by reference in its entirety).

Now, the theoretical motivation for using the generalized VTV is discussed. Also discussed are update equations for VTV constrained spectral CT reconstruction using the Chambolle-Pock primal-dual method, as well as a demonstration of the improvement of the VTV-norm-based reconstruction method over the TV-norm based reconstruction method.

For conventional non-spectral CT, the basic framework for TV-based image reconstruction is summarized by the optimization problem $$\operatorname*{argmin}_{u}\{\|u\|_{TV}\} \text{ such that } \|Au - f\|_2 \leq \epsilon$$

where A is the projection matrix, u is the desired image, and $\epsilon$ is a parameter that balances the trade-off between data fidelity and regularity.

Next, we define the conventional TV semi-norm $\|\cdot\|_{TV}$ and develop the motivation for using the generalized VTV norm.

The total-variation semi-norm employed for CT reconstruction is given by $$\|u\|_{TV} = \sum_{j=1} \|\nabla_j u\|_2,$$

The operator $\nabla_j$ the discrete approximation to the gradient at pixel j. Additional details regarding the conventional TV semi-norm $\|\cdot\|_{TV}$ are given in E. Sidky, et al., "Accurate image reconstruction from few-views and limited-angle data in divergent beam CT," *J Xray Sci Technol*, 14, p. 119 (2008), incorporated herein by reference. In addition to the usefulness of the TV semi-norm in handling sparse data, the penalty imposed by the TV semi-norm is both edge-preserving and convex, which are important properties that are also present in the VTV norm.

Now the ideas of the TV-norm reconstruction method to CT are extended using multiple dataset types. While the discussion focuses on spectral CT, the method is general and can be applied to other forms of image reconstruction having multiple dataset types. For spectral CT, the image and data vectors consist of M different spectral channels given by $$\vec{u} = \begin{pmatrix} u_1 \\ \vdots \\ u_M \end{pmatrix}, \vec{f} = \begin{pmatrix} f_1 \\ \vdots \\ f_M \end{pmatrix}.$$

In one implementation, the VTV norm is given by $$\|\vec{u}\|_{VTV} = \sum_{j=1} \|D_j \vec{u}\|_{S_1}.$$

Since $\vec{u}$ is now a vector function, where each pixel corresponds to a vector of "color" values, the quantity $D_j \vec{u}$ is the discrete approximation of the M×N Jacobian matrix at pixel j, where M and N refer to the number of spectral channels and spatial dimensions, respectively. We have replaced the $l_2$-norm of the gradient with the nuclear norm (a.k.a. Schatten 1-norm) of the Jacobian. At pixel j, the Jacobian has the following structure:

$$D_j \vec{u} = \begin{bmatrix} \leftarrow (\nabla_j u_1)^T \rightarrow \\ \vdots \\ \leftarrow (\nabla_j u_M)^T \rightarrow \end{bmatrix}_{M \times N},$$

where each row is given by the discrete gradient of the corresponding spectral channel.

Consistent with the methodology of the TV semi-norm, wherein the edges are preserved by penalizing solutions for which the gradient of the image was not sparse, the penalty for sparse spectral CT reconstruction should minimize the rank of the Jacobian over all pixels. The rank of the Jacobian will be zero in constant-valued regions of the image, and it will be one when the gradient vectors of each spectral channel point in the same direction. Such a rank-minimizing penalty encourages gradient-sparse solutions in the same way as the conventional TV, and it also favors solutions having common edge directions in all channels.

A true rank-minimizing penalty seeks to minimize $\|\cdot\|_{S_0}$, but this leads to an optimization problem that is non-convex and NP-hard. Instead of using the norm $\|\cdot\|_{S_0}$, the norm $\|\cdot\|_{S_1}$ is used as a convex surrogate.

Using this VTV norm, the primal optimization problem is given by $$\underset{\vec{u}}{\mathrm{argmin}}\{\|\vec{u}\|_{VTV}\} \text{ such that } \|A\vec{u} - \vec{f}\|_2 \leq \epsilon,$$

where the operator A is the CT projection matrix applied to each channel of $\vec{u}$. In one implementation, the image reconstruction problem is solved using the primal-dual algorithm proposed by Chambolle and Pock.

The basic premise of the Chambolle-Pock method is to recast the primal optimization problem into a saddle-point problem and to alternate between gradient descent steps in the primal variable and ascent steps in the dual variables using a proximal splitting scheme. The saddle-point problem equivalent to the primal optimization problem is $$\underset{\vec{u}}{\mathrm{minmax}} \{-\langle \vec{u}, Div(\vec{\zeta})\rangle + \langle \vec{q}, A\vec{u} - \vec{f}\rangle - \delta_S(\vec{\zeta}) - \epsilon\|\vec{q}\|_2^2\}$$

where $\delta_S(\vec{\ })$ is an indicator function defined as $$\delta_S(\vec{\zeta}) = \begin{cases} \infty & \sigma_{max}(\vec{\zeta}) \leq 1 \\ 0 & \text{otherwise} \end{cases},$$

and the Div operator is the discrete divergence operator applied to each spectral channel of $\vec{u}$. The update equations follow from this saddle-point problem in a straight-forward manner as discussed in the previous reference by E. Y. Sidky, J. H. Jørgensen, and X. Pan detailing the application of the CP algorithm to related optimization problems.

Figure 4:
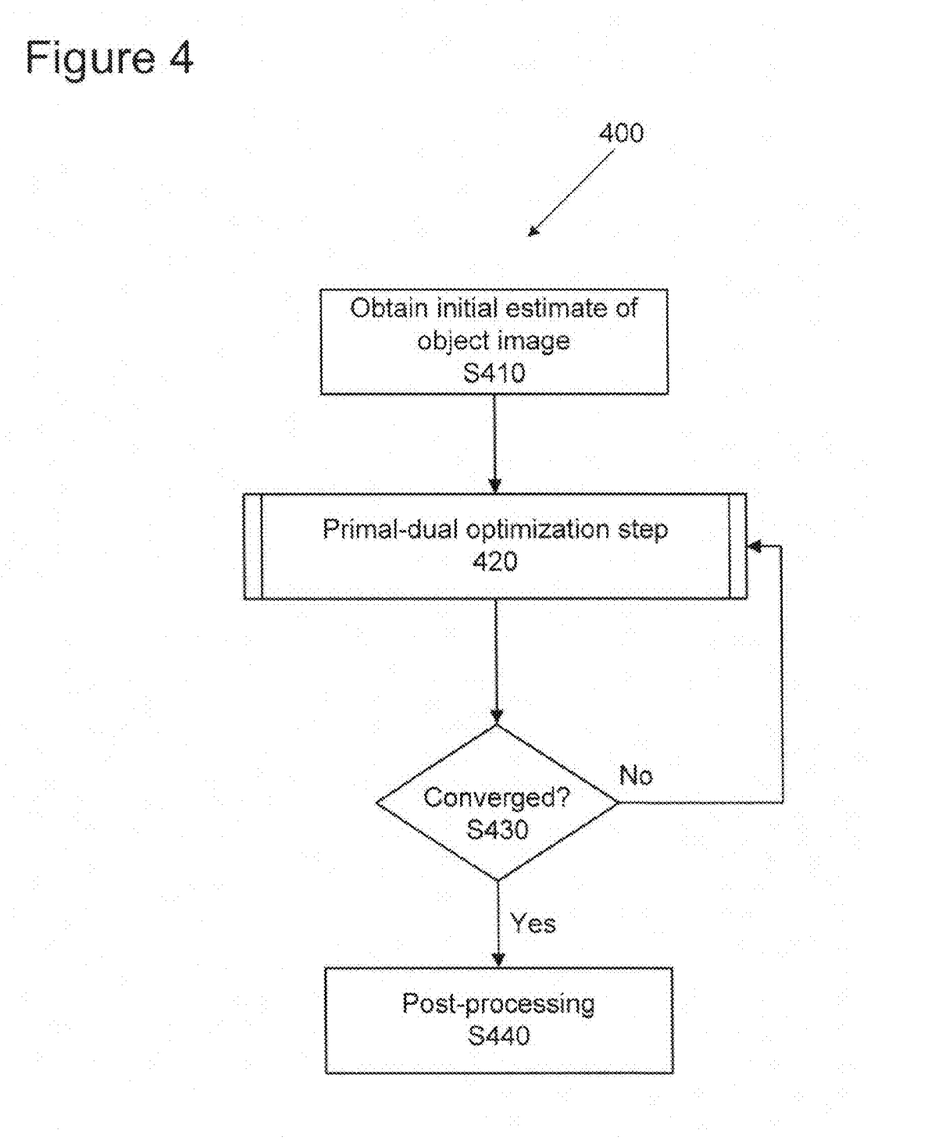
FIG. 4 shows a flow diagram of an implementation of a method to reconstruct CT images using primal-dual optimization.

FIG. 4 shows a method for iterative image reconstruction using a primal-dual optimization step or variation thereof. The first step S410 is obtaining the projection data. For example, the data can be obtained by taking a series of projection measurements at predetermined angles, or the data can be previously obtained and stored on a computer-readable memory from which it is retrieved in step S410.

The second step 420 is a process whereby the images $\vec{u}$ and related values are updated. There are many methods for iterative image reconstruction based on dual-primal optimization, one of which is Chambolle-Pock algorithm discussed in the flow diagram shown in FIG. 5. While the Chambolle-Pock method is particularly efficient for solving the present problem, other methods for calculating updated images that accomplish the same primal-dual optimization include the forward-backward proximal splitting method, the Douglas-Rachford splitting method, the alternating direction method of multipliers, the Korpelevich extragradient method, the Arrow-Hurwicz method, and the Nesterov's smoothing method.

The third step S430 inquires whether the reconstructed image has sufficiently converged according to a predetermined convergence criterion. For example, the convergence criterion can be whether the distance between the previous and current images is less than a predetermined value, where the distance is defined by some predetermined distance measure such as an $l_2$-norm taken on the difference between the previous and current images. If the image has not adequately converged, then method 400 proceeds back to process 420. Otherwise, the iterative loop is complete and method 400 proceeds to the post processing step S440.

In the final step S440, post processing of the data is performed. This post processing can include filtering steps, image processing such as volume rendering and image difference processing, image-domain material decomposition, and determining various basis-image representations, such as maps of the attenuation, density, or effective Z.

Figure 5:
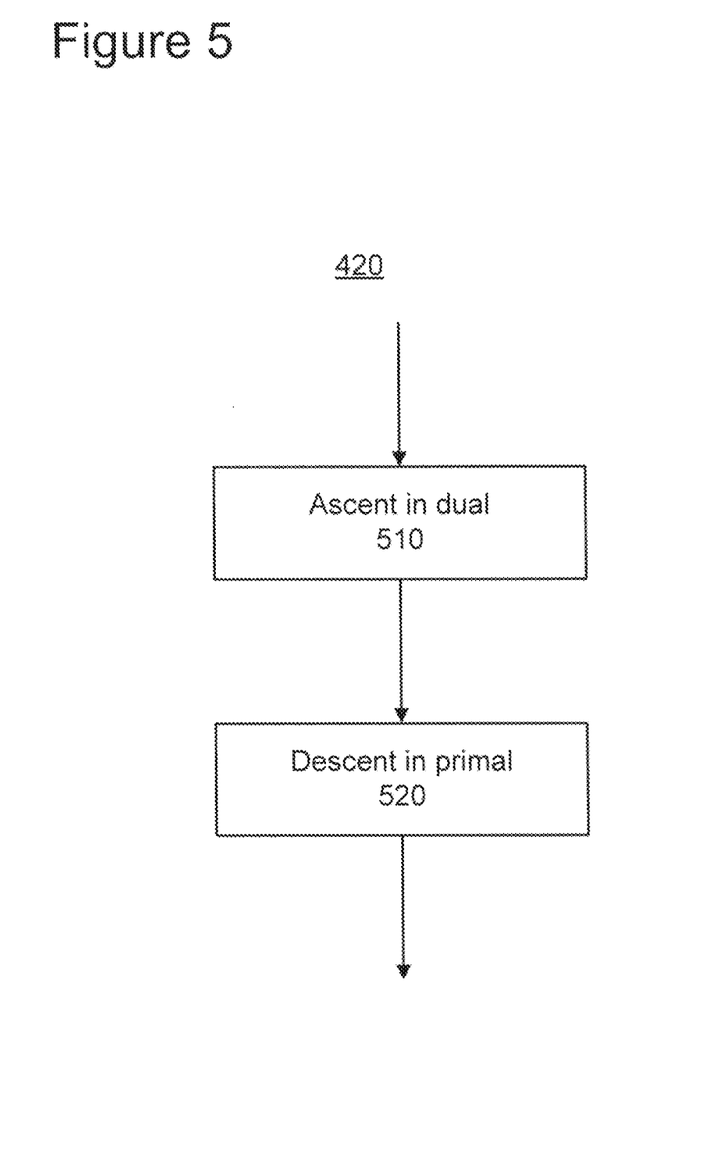
FIG. 5 shows an implementation of a split step saddle-point optimization update step.

FIG. 5 shows a flow diagram of the primal-dual optimization process 420 of calculating the updates to the image and related values. The first step 510 of process 420 is to update the image and related values according to an ascent of the dual. The second step 520 of process 420 is to update the image and related values according to a descent of the primal. In the Chambolle-Pock method, update equations achieving the objectives of steps 510 and 520 are performed by proximal mappings of the resolvent operators, as discussed in discussed in the previous reference by A. Chambolle and T. Pock.

The primal optimization problem has one free parameter, $\epsilon$, that controls the trade-off between data-fidelity and regularity. In practice, the best choice of $\epsilon$ will depend on how noisy the data is and the particular clinical task.

In an alternative implementation, the

Figure 6:
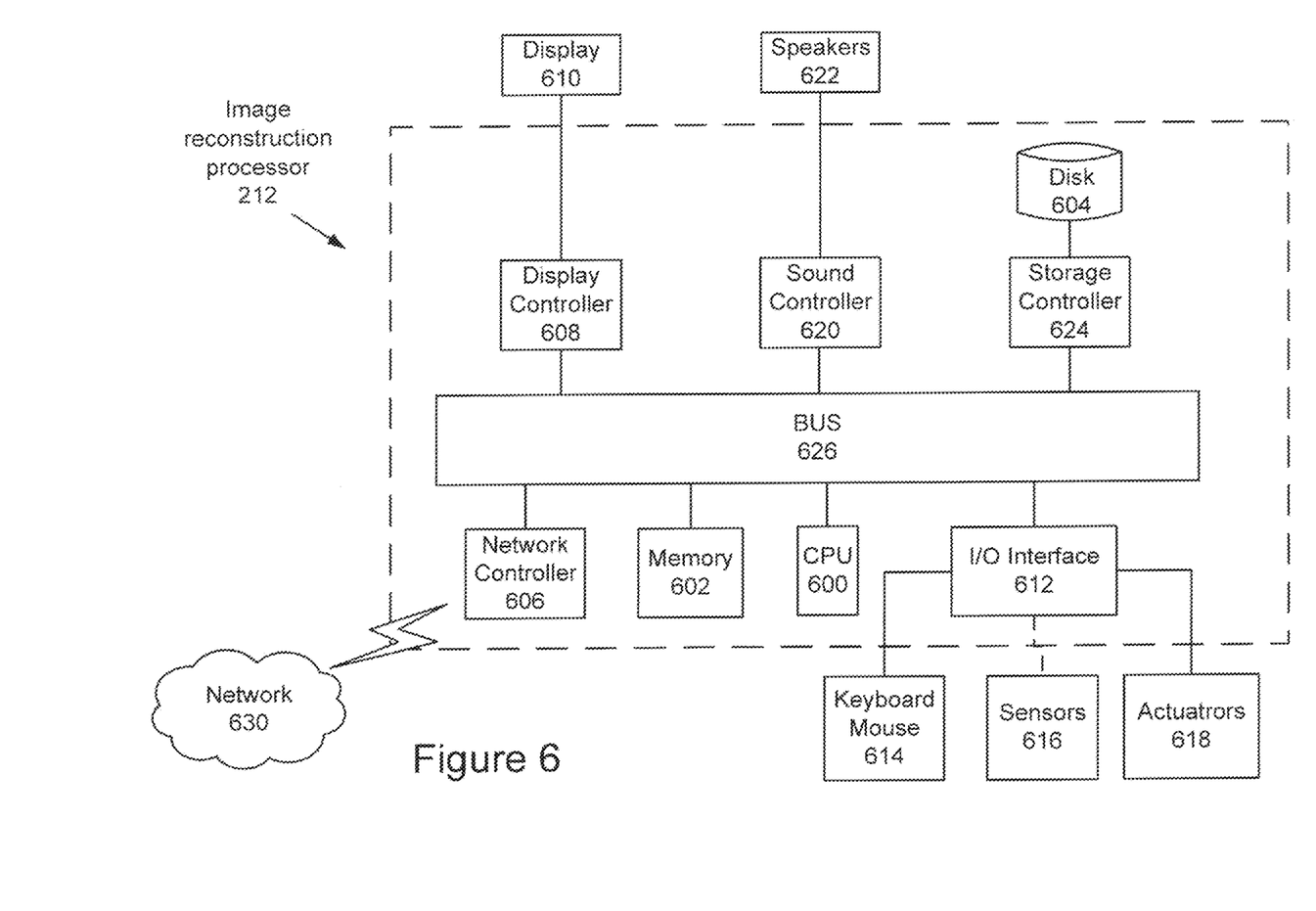
FIG. 6 shows a schematic diagram of an implementation of an image reconstruction processing unit.

FIG. 6 shows an implementation of the image reconstruction processor 212 that performs the method 400. In FIG. 6, the image reconstruction processor 212 includes a CPU 600 which performs the processes described herein. Process data and instructions may be stored in memory 602. Processes and instructions may also be stored on a storage medium disk 604 such as a hard drive (HDD) or portable storage medium or may be stored remotely. Further, this disclosure is not limited by the form of the computer-readable media on which the instructions are stored. For example, the instructions may be stored on CDs, DVDs, in FLASH memory, RAM, ROM, PROM, EPROM, EEPROM, hard disk or any other information processing device with which the image reconstruction processor 212 communicates, such as a server or computer.

Further, aspects of this disclosure may be provided as a utility application, background daemon, or component of an operating system, or combination thereof, executing in conjunction with CPU 600 and an operating system such as Microsoft Windows 7, UNIX, Solaris, LINUX, Apple MAC-OS and other systems known to those skilled in the art.

CPU 600 may be a Xenon or Core processor from Intel of America or an Opteron processor from AMD of America, or may be other processor types that would be recognized by one of ordinary skill in the art, such as an ARM-based processor. Alternatively, the CPU 600 may be implemented on an FPGA, ASIC, PLD or using discrete logic circuits, as one of ordinary skill in the art would recognize. Further, CPU 600 may be implemented as multiple processors cooperatively working in parallel to perform the instructions of the inventive processes described above.

The image reconstruction processor 212 in FIG. 6 also includes a network controller 606, such as an Intel Ethernet PRO network interface card from Intel Corporation of America, for interfacing with network 630. As can be appreciated, the network 630 can be a public network, such as the Internet, or a private network such as an LAN or WAN network, or any combination thereof and can also include PSTN or ISDN sub-networks. The network 630 can also be wired, such as an Ethernet network, or can be wireless such as a cellular network including EDGE, 3G and 4G wireless cellular systems. The wireless network can also be WiFi, Bluetooth, or another wireless form of communication.

The image reconstruction processor 212 further includes a display controller 608, such as a NVIDIA GeForce GTX or Quadro graphics adaptor from NVIDIA Corporation of America that respectively interface with a corresponding display 610, such as a Hewlett Packard HPL2445w LCD monitor.

The image reconstruction processor 212 further includes a general purpose I/O interface 612 interfaces with a keyboard and/or mouse 614 as well as sensors 616. The general purpose I/O interface 612 can also connect to a variety of actuators 618. The general purpose I/O interface 612 can also connect to a variety of peripherals including printers and scanners, such as an OfficeJet or DeskJet from Hewlett Packard.

A sound controller 620 is also provided in the image reconstruction processing unit 212, such as Sound Blaster X-Fi Titanium from Creative, to interface with speakers/microphone 622 thereby providing sounds and/or music.

The general purpose storage controller 624 connects the storage medium disk 604 with communication bus 626, which may be an ISA, EISA, VESA, PCI, or similar, for interconnecting all of the components of the image reconstruction processing unit 212. A description of the general features and functionality of the display 610, keyboard and/or mouse 614, as well as the display controller 608, storage controller 624, network controller 606, sound controller 620, and general purpose I/O interface 612 is omitted herein for brevity as these features are known.

Figure 7:
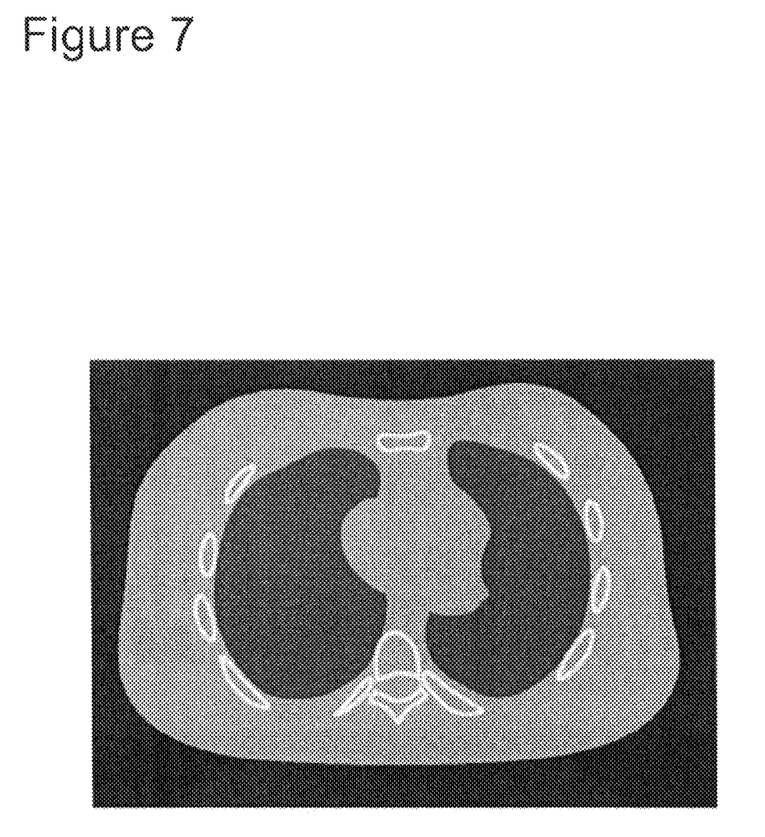
FIG. 7 shows a cross-section a of an anthropomorphic thorax phantom.
Figure 8:
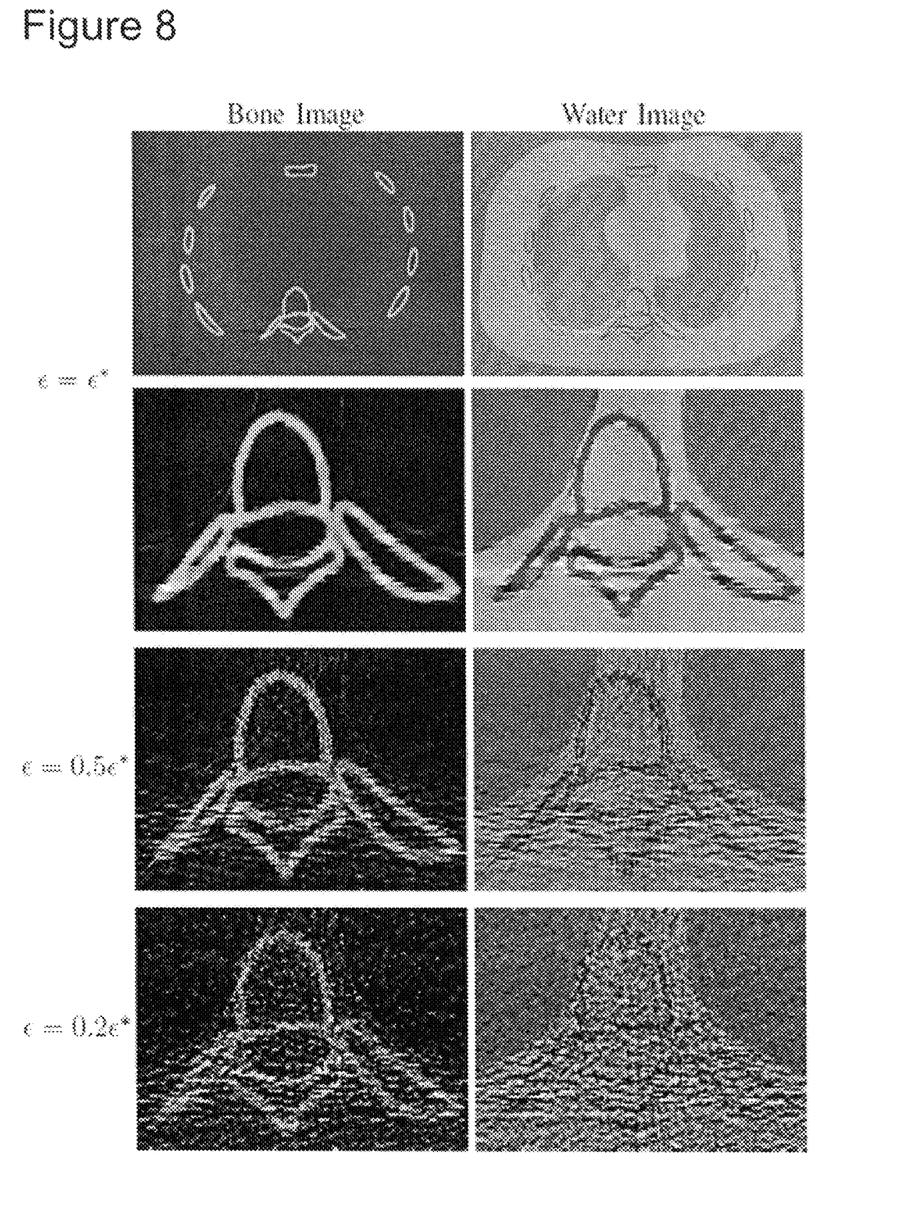
FIG. 8 shows a series reconstructed images of an anthropomorphic thorax phantom using a channel-by-channel total variation minimization method.
Figure 9:
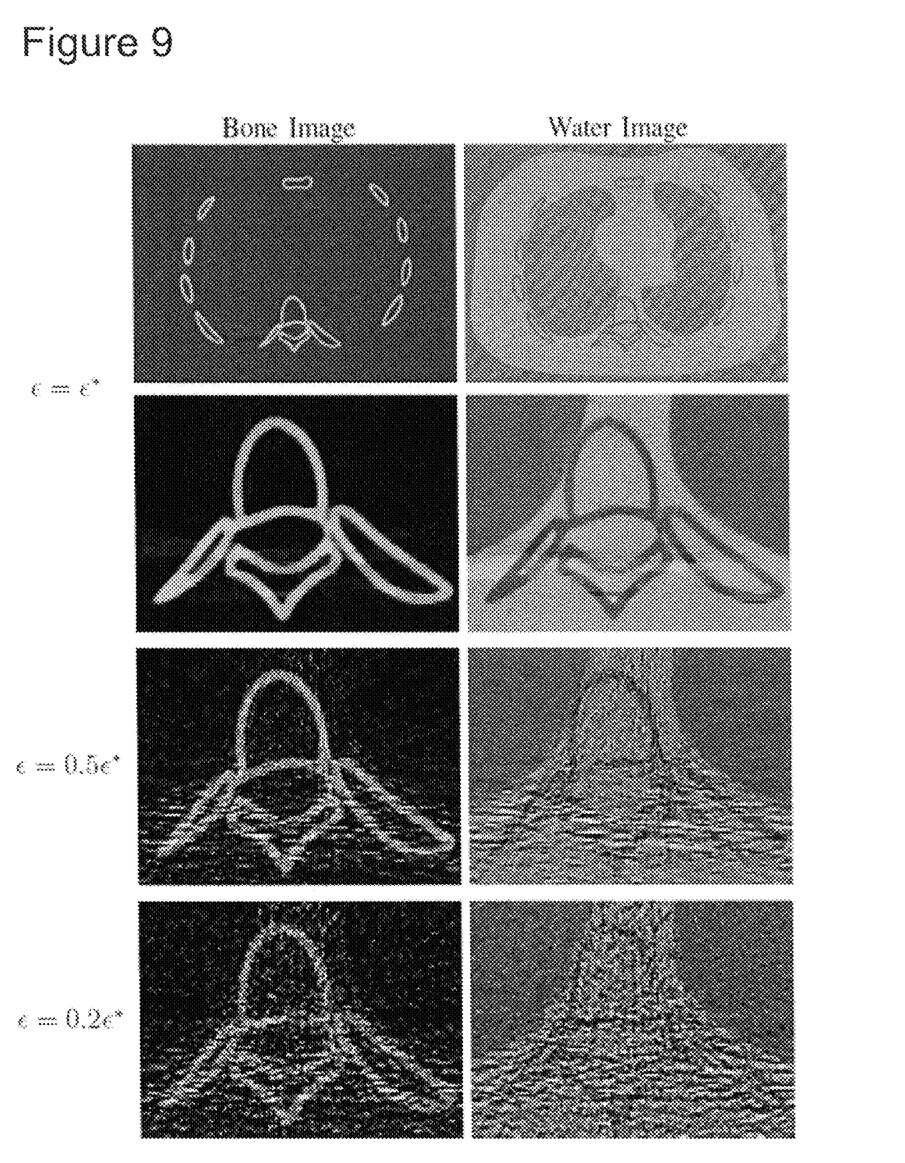
FIG. 9 shows a series of reconstructed images of an anthropomorphic thorax phantom using a vectorial total variation minimization method.

FIGS. 7-9 demonstrate the advantages of the VTV method applied collectively to multiple channels compared to the TV method applied separately to each channel FIG. 7 shows an anthropomorphic thorax phantom composed of bone and soft-tissue (water). Simulated CT data was created from this phantom creating 100 views of noisy projection data at 60, 80, and 100 keV with a detector sampling of 896 bins. FIG. 8 shows the channel-by-channel image reconstructed using the TV iterative image reconstruction method. FIG. 9 shows the VTV reconstructed images. All images were reconstructed onto a 512-512 grid with 1 mm pixels. Table 2 gives the root-mean-square error (RMSE) for each of the reconstructed images. The same values of $\epsilon$ are used between the two cases in order to make a valid comparison.

TABLE 2

Image root-mean-square error (RMSE) for the conventional TV method applied channel-by-channel (TVs) and the VTV method applied simultaneously to all channels.

| $\epsilon/\epsilon^*$ | TVs | | | VTV | | |
|---|---|---|---|---|---|---|
| | 0.2 | 0.5 | 1.0 | 0.2 | 0.5 | 1.0 |
| 60 keV image | 0.057 | 0.025 | 0.015 | 0.048 | 0.023 | 0.011 |
| 80 keV image | 0.040 | 0.017 | 0.010 | 0.036 | 0.016 | 0.007 |
| 100 keV image | 0.035 | 0.014 | 0.008 | 0.032 | 0.013 | 0.005 |
| bone image | 0.560 | 0.228 | 0.074 | 0.477 | 0.216 | 0.045 |
| water image | 0.752 | 0.303 | 0.086 | 0.649 | 0.288 | 0.039 |

Since, in this simulation study, the ground truth image is available, the ground truth image is used to establish a baseline for reasonable $\epsilon$ values. Particularly, the reference value, $\epsilon^*$ is calculated as $$\epsilon^* = \|\vec{A}_{true} - \vec{\ }\|_2,$$

where $\vec{\ }_{true}$ is the ground truth image data and $\vec{\ }$ is the noisy projection data. Then the reconstruction is performed by selecting $\epsilon = \gamma \epsilon^*$, where $0 < \gamma < 1$. For this study, values of 0.2, 0.5, and 1.0 are used for $\gamma$ in order to evaluate the impact of our VTV for different levels of regularization.

In FIGS. 8-9, the 60, 80, and 100 keV energy channel images were reconstructed, and a post-reconstruction, image-domain material decomposition was performed. Since the simulations used perfectly monochromatic data, the decomposition amounts to solving a trivial linear system (i.e., there is no issue for beam hardening or related complications encountered in practice).

Qualitatively, it can be observed that using the VTV regularizer has a universally positive impact on the images, reducing artifacts and producing much cleaner edges. This trend is consistent for all energy channels and $\epsilon$ values. Additionally, it can be observed that the overall image accuracy is improved, which can be seen from the RMSE values in Table 2.

Generally, the VTV method possesses many of the desirable properties of the conventional TV penalty approach, and additionally introduces a coupling between spectral channels that encourages a consistent edge structure. Using the VTV penalty results in cleaner edges and reduced artifacts compared to separately reconstructing each channel. An additional benefit is that the resulting optimization problem is no more difficult than the conventional constrained TV minimization problem, by using simple update equations based on the primal-dual CP algorithm.

While certain implementations have been described, these implementations have been presented by way of example only, and are not intended to limit the teachings of this disclosure. Indeed, the novel methods, apparatuses and systems described herein may be embodied in a variety of other forms; furthermore, various omissions, substitutions and changes in the form of the methods, apparatuses and systems described herein may be made without departing from the spirit of this disclosure.

The invention claimed is:

1. An apparatus, comprising:
   circuitry configured to
      obtain a plurality of projection datasets, wherein each projection dataset is obtained from a different detector type or different detector configuration; and
      reconstruct, from the respective plurality of projection datasets, a corresponding plurality of images using a combined image reconstruction, wherein the combined image reconstruction increases a spatial correlation among the images of the plurality of images relative to if each the plurality of images had been separately reconstructed, thereby to improve an image quality of the plurality of images.

2. The apparatus according to claim 1, wherein the circuitry is further configured to reconstruct the plurality of images using the combined image reconstruction, which uses a vectorial-total-variation norm of the plurality of images.

3. The apparatus according to claim 1, wherein the circuitry is further configured to obtain the plurality of projection datasets, which includes a first projection dataset from an energy-integrating detector and a second projection dataset from a photon-counting spectrally-discriminating detector.

4. The apparatus according to claim 3, further comprising:
   an X-ray source radiating X-rays;
   the energy-integrating X-ray detector configured to detect the X-rays that are radiated from the X-ray source and generate the first projection dataset; and the photon-counting spectrally-discriminating X-ray detector configured to detect the X-rays that are radiated from the X-ray source and generate the second projection dataset.

5. The apparatus according to claim 1, wherein the circuitry is further configured to obtain the plurality of projection datasets, which includes a first projection dataset from an energy-integrating detector arranged in a closely packed third-generation geometry and a second projection dataset from a photon-counting spectrally-discriminating detector arranged in a sparsely distributed fourth-generation geometry.

6. The apparatus according to claim 1, wherein the circuitry is further configured to obtain the plurality of projection datasets, which includes a first projection dataset obtained using a detector configuration to detect a first spectrum and a second projection dataset obtained using a detector configuration to detect a second spectrum, wherein the energy expectation value of the first spectrum is greater than the energy expectation value of the second spectrum.

7. The apparatus according to claim 1, wherein the circuitry is further configured to obtain the plurality of projection datasets, which includes a first projection dataset from a photon-counting detector post-processed to include detection events corresponding to a first spectrum and a second projection dataset from a photon-counting detector post-processed to include detection events corresponding to a second spectrum, wherein the energy expectation value of the first spectrum is greater than the energy expectation value of the second spectrum.

8. The apparatus according to claim 2, wherein the circuitry is further configured to reconstruct the plurality of images by solving a primal optimization problem by minimizing the vectorial-total-variation norm of the plurality of images such that a first condition is also satisfied.

9. The apparatus according to claim 8, wherein the circuitry is further configured to reconstruct the plurality of images such that the first condition is a constraint that $$\|A\vec{u} - \vec{f}\|_p < \epsilon,$$

wherein $\vec{u}$ is a vector of image values, $\vec{f}$ is a vector of the plurality of projection datasets, A is a system matrix relating the image values to the projection datasets values, and $\epsilon$ is an error bound of a p-norm of a system matrix equation.

10. The apparatus according to claim 1, wherein the circuitry is further configured to reconstruct the plurality of images by solving a primal optimization problem according to one of $$\operatorname*{argmin}_{\vec{u}} \{\|\vec{u}\|_{VTV} \text{ such that } \|A\vec{u} - \vec{f}\|_p < \epsilon\},$$

$$\operatorname*{argmin}_{\vec{u}} \{\|\vec{u}\|_{VTV} + w_1 \Big(\sum_{j+1} \|D_j \vec{u}\|_n^m\Big)^q \text{ such that } \|A\vec{u} - \vec{f}\|_p < \epsilon\},$$

and $$\operatorname*{argmin}_{\vec{u}} \{\|\vec{u}\|_{VTV} + w_1 \|A\vec{u} - \vec{f}\|_j^k + w_2 (\sum_{j+1} \|D_j \vec{u}\|_n^m)^q\},$$

wherein $\vec{u}$ is a vector of image values, $\vec{f}$ is a vector of the plurality of projection datasets; A is a system matrix relating the image values to the projection datasets values; i, j, k, m, n, p, and q are parameters in the range [0,∞], $\epsilon$ is an error threshold limiting the solution error of the system matrix equation, and $w_1$ and $w_2$ are predetermined weight factors to balance the relative significance of the terms in each minimization expression.

11. The apparatus according to claim 8, wherein the circuitry is further configured to solve the primal optimization problem, which has been expressed as a primal-dual saddle-point problem, using one of: a forward-backward proximal splitting method, a Douglas-Rachford splitting method, an alternating direction method of multipliers, a Korpelevich extragradient method, an Arrow-Hurwicz method, a Nesterov's smoothing method, and a Chambolle-Pock primal-dual method.

12. A method, comprising:
obtaining a plurality of projection datasets, wherein each projection dataset of the plurality of projection datasets is obtained from a different detector type or configuration; and
reconstructing, from the respective plurality of projection datasets, a corresponding plurality of images using a combined image reconstruction, wherein the combined image reconstruction increases a spatial correlation among the images of the plurality of images relative to if each the plurality of images had been separately reconstructed, thereby to improve an image quality of the plurality of images.

13. The method according to claim 12, wherein the reconstructing step comprises reconstructing the plurality of images using the combined image reconstruction, which uses a vectorial-total-variation norm of the plurality of images.

14. The method according to claim 12, wherein the obtaining step comprises obtaining the plurality of projection datasets, which includes a first projection dataset representing projection data from an energy-integrating detector and a second projection dataset representing projection data from a photon-counting spectrally-discriminating detector.

15. The method according to claim 12, wherein the obtaining step comprises obtaining the plurality of projection datasets, which includes a first projection dataset representing projection data from an energy-integrating detector arranged in a closely packed third-generation geometry and a second projection dataset representing projection data from a photon-counting spectrally-discriminating detector arranged in a sparsely distributed fourth-generation geometry.

16. The method according to claim 12, wherein the obtaining step comprises obtaining the plurality of projection datasets, which includes a first projection dataset representing projection data obtained using a detector configuration to detect a first spectrum and a second projection dataset representing projection data obtained using a detector configuration to detect a second spectrum.

17. The apparatus according to claim 1, wherein the obtaining step comprises obtaining the plurality of projection datasets, which includes a first projection dataset representing projection data from a photon-counting detector post-processed to include detection events corresponding to a first spectrum and a second projection dataset representing projection data from a photon-counting detector post-processed to include detection events corresponding to a second spectrum, wherein the energy expectation value of the first spectrum is greater than the energy expectation value of the second spectrum.

18. The method according to claim 12, wherein the step of reconstructing the plurality of images is performed by solving a primal optimization problem by minimizing the vectorial-total-variation norm of the plurality of images such that a first condition is also satisfied.

19. The method according to claim 18, wherein the first condition is that $$\|A\vec{x} - \vec{y}\|_p < \epsilon,$$

wherein $\vec{x}$ is a vector of image values, $\vec{y}$ is a vector of values of the plurality of projection datasets, A is a system matrix relating the image values to the projection data values, and $\epsilon$ is an error bound of the p-norm of a system matrix equation.

20. The method according to claim 18, wherein the step of reconstructing the plurality of images comprises solving the primal optimization problem, which has been expressed as a primal-dual saddle-point problem using one of: a forward-backward proximal splitting method, a Douglas-Rachford splitting method, an alternating direction method of multipliers, a Korpelevich extragradient method, an Arrow-Hurwicz method, a Nesterov's smoothing method, and a Chambolle-Pock primal-dual method.

21. A non-transitory computer-readable medium storing executable instructions, wherein the instructions, when executed by circuitry, cause the circuitry to perform a method, comprising:

obtaining a plurality of projection datasets, wherein each projection dataset of the plurality of projection datasets is obtained from a different detector type or configuration; and reconstructing, from the respective plurality of projection datasets, a images of the plurality of images using a combined image reconstruction, wherein the combined image reconstruction increases a spatial correlation among the corresponding plurality of images relative to if each the plurality of images had been separately reconstructed, thereby to improve an image quality of the plurality of images.

22. An apparatus, comprising:

circuitry configured to obtain a plurality of projection datasets, wherein each projection dataset represents projection data of a corresponding energy range;

decompose the plurality of projection datasets into a plurality of material projection datasets representing a material decomposition of the plurality of projection datasets; and reconstruct, from the respective plurality of material projection datasets, a corresponding plurality of images using a combined image reconstruction, wherein the combined image reconstruction increases a spatial correlation among the images of the plurality of images relative to if each the plurality of images had been separately reconstructed, thereby to improve an image quality of the plurality of images.

* * * * *